Sept. 8, 1936.          C. W. CRUMRINE          2,054,035
                        FOLDING CAMERA
             Filed Jan. 15, 1936         2 Sheets-Sheet 1

Chester W. Crumrine,
INVENTOR
BY
ATTORNEYS.

Sept. 8, 1936.     C. W. CRUMRINE     2,054,035
FOLDING CAMERA
Filed Jan. 15, 1936     2 Sheets-Sheet 2

Chester W. Crumrine,
INVENTOR:

BY

ATTORNEYS.

Patented Sept. 8, 1936

2,054,035

UNITED STATES PATENT OFFICE 2,054,035

FOLDING CAMERA

Chester W. Crumrine, Rochester, N. Y., assignor to Eastman Kodak Company, Rochester, N. Y., a corporation of New York Application January 15, 1936, Serial No. 59,250

16 Claims. (Cl. 95—39)

This invention relates to photography and more particularly to folding camera construction. One object of my invention is to provide a camera which may be opened or closed with the minimum effort. Another object of my invention is to provide a camera particularly adapted for high speed photographic objectives in which the objective holding structure is rigidly latched in an operative or picture-taking position when the camera is opened. Another object of my invention is to provide a simple and positive latching mechanism for holding the front in an operative position. Another object of my invention is to provide a latch mechanism with means for releasing the mechanism automatically by moving a single lever. Still another object of my invention is to provide a camera with a focusing mechanism so arranged that the mechanism must be returned to an infinity position before the camera can be folded. Still other objects will appear from the following specification, the novel features being particularly pointed out in the claims at the end thereof.

With high-grade objectives, and particularly those which work at exceedingly wide apertures, such as $f/2$, for instance, in order to obtain the best results it is necessary to have the film lie accurately in the focal plane of the objective and to provide a front mechanism which will hold the lens accurately at right angles to the plane of the film. It is also desirable to provide a front for supporting the objective which will lie accurately in a plane and which may be definitely latched in its operative position on both sides, so that the possibility of the lens board moving angularly with respect to its correct position at right angles to the axis of the objective is eliminated.

The most rigid type of camera construction employs a lens board which is latched in position, and it is customary with this type of camera to focus the camera objective by moving the objective and shutter relative to the lens board by means of a focusing mechanism, such as cooperating threaded sleeves, as is well known in the art. With such a structure the objective and shutter, because of their size, must lie in a fixed position with respect to the lens board before the camera can be closed, and since damage may result in attempting to close a camera with the objective positioned some distance from the lens board, it is desirable to prevent the camera from being closed until the focusing mechanism has been returned to its closing position, which normally occurs when the focusing lever has been moved to the infinity mark on the focusing scale.

Coming now to the drawings wherein like reference characters denote like parts throughout:

The present invention is for an improvement over the latching mechanism shown in my copending application for Self-erecting front camera, Serial No. 19,012, filed April 30, 1935. In this application a pair of latch elements is used to hold the front in an erect position, but it is necessary, in folding the camera, to release two latch elements before the camera can be folded. The present invention not only includes a focusing mechanism which must be properly adjusted before the camera can be folded, but the focusing mechanism is used to simultaneously release the latch members when it has been moved to the proper position. In the present invention two different types of latches are used on the two sides of the camera front, thus adding to the rigidity of the structure as a whole, since the two latch members depend on different parts of the front projecting structure.

Figure 1:
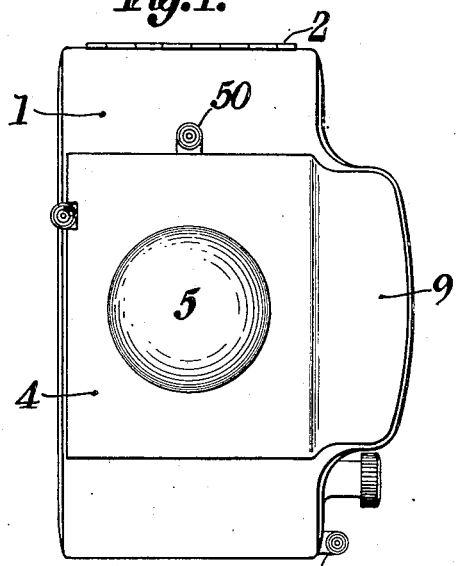
Fig. 1 is a front elevation of a camera constructed in accordance with and embodying a preferred form of my invention.

As indicated in Fig. 1 the camera may consist broadly of a camera body 1 to which the usual type of camera back may be attached at one end by a hinge 2, there being a latch 3 at the other end for holding these parts together. The camera is provided with a bed 4 preferably provided with an outwardly extending annular portion 5 to enclose a front lens cell 6 when the camera is folded. The camera bed is hinged on a pintle 7 carried by the brackets 8, which extend outwardly from the camera body. In the form illustrated the bed is provided with an offset portion 9 adapted to enclose the front wall 10 of a housing 11 enclosing finder and range finder elements.

Figure 6:
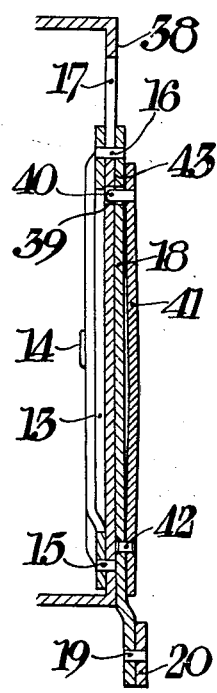
Fig. 6 is a fragmentary section on line 6—6 of Fig. 2, with one of the latch elements shown in a latching position.
Figure 7:
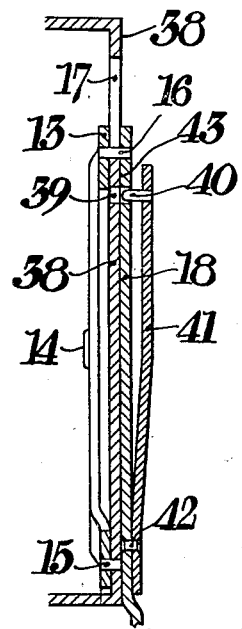
Fig. 7 is a similar view but with the latch elements shown in an unlatching position.

The camera front or lens board 12 is of the type shown in my co-pending application above referred to, which is supported by means of lazy tongs 13 pivoted together at 14, one of said lazy tongs being pivoted at 15 to the lens board 12 and the other of the lazy tongs carrying a stud 16 adapted to slide in the slot 17 in the lens board. Thus, the lens board and camera body are always held in a parallel relation to the camera body, and since the pivot 16 also supports a link 18, as best shown in Figs. 6 and 7, which is pivotally attached at 19 to a bracket 20 forming a part of the camera bed 4, the bed and lazy tongs may be operated at the same time, and the bed can conveniently be used as a handle for opening and closing the structure.

Figure 3:
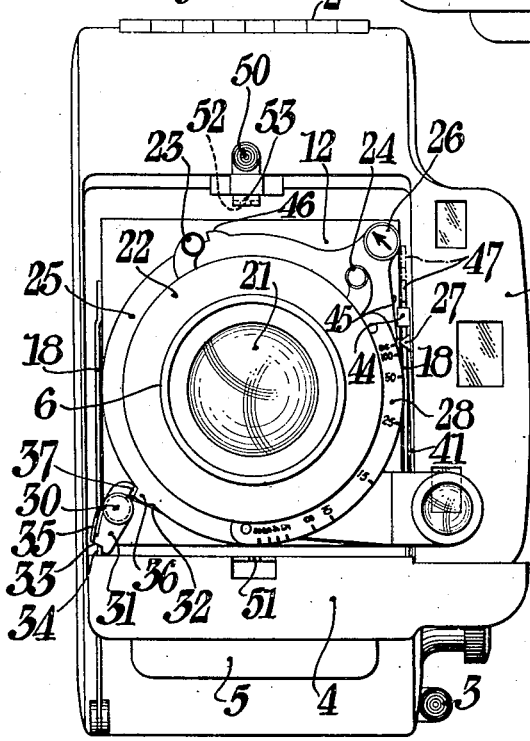
Fig. 3 is a front elevation of the camera shown in Fig. 2 in an open or picture-taking position.

Referring to Fig. 3, it will be noticed that the camera objective 21 may be carried in the usual type of shutter or housing 22 having an operating trigger 23 and a shutter setting lever 24. The objective and shutter can be moved as a unit for focusing by means of a focusing ring 25, this focusing ring being provided with a handle 26 which operates a threaded or angular slot and pin focusing structure. Both of these focusing structures are well known in the art.

There is a pointer 27 which lies opposite a scale 28 carried by the focusing ring 25. As shown in Fig. 3 the camera is set for focus on infinity, and by swinging the handle 26 in the direction shown by the arrow, any one of the focal units on the scale 28 may be brought opposite the pointer 27.

However, when it is desired to close the camera, the camera cannot be closed until the shutter and objective are moved to their initial position of rest against the lens board 12. This can readily be accomplished by moving the lever 26 in a clockwise direction. By moving the lever 26 from the position shown in Fig. 3 to the position shown in Fig. 5, the latching mechanism will be both automatically released so that the camera may be closed by merely pressing upwardly on the bed 4. The latching mechanisms are as follows: On one portion of the lens board 12 there is a stud 30 which carries a lever 31, pressed by spring 32, into a latching position, in which the shoulder 33 lies over the top of the lug 34 carried by one of the links 18 which connect the lazy tong members 13 with the camera bed 4. Lever 31 has a finger release 35 which can be used to release its latching engagement, but, as will appear from Figs. 3 and 5, when the focusing lever 26 is moved to its Fig. 5 position, a lug 36 on the ring strikes a flange 37 on the lever 31, and thus moves it against the pressure of spring 32 to its unlatched position.

It should be noted that when member 31 is moved to its unlatched position, the lug 36 rides under the flange 37 so that the pressure of spring 32 cannot exert a torque upon the focusing ring 25, tending to move it from its set position.

On the opposite side of the lens board 12 there is a second latch member, best shown in Figs. 6 and 7. The flange 38 of the lens board 12 is provided with an aperture 39 adapted to receive a pin 40 carried by the leaf spring 41 riveted at 42 to the link 18. As the camera is opened and the link 18 gradually moves downwardly by reason of the pin 16 sliding downwardly through slot 17, the pin 40 rides over the outer surface 43 of flange 38 until the aperture 39 is reached, at which position the pin 40 drops into the aperture 39 and prevents further movement, either upwardly or downwardly, of the link 18. Consequently, these parts are definitely latched together until the pin is released from its aperture.

To accomplish this the leaf spring 41 is provided with an overturned flange 44 which lies in the path of the straight edge 45 on the focusing ring 25. When the handle 26 is moved in a clockwise direction as indicated in Fig. 5, the straight edge 45 strikes the flange 44 and moves the leaf spring 41 to its Fig. 7 position, in which the pin 40 has been withdrawn from the aperture 39 in the lens board flange 38 so that the link 18 may again move.

Figure 5:
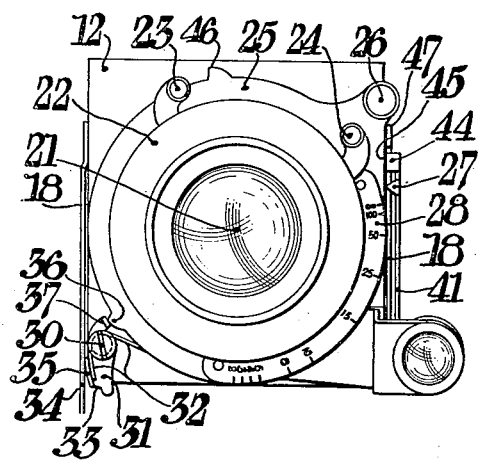
Fig. 5 is a fragmentary front elevation showing the focusing and latching mechanism in an unlatched position.

In other words, when the focusing lever 26 has been moved to its Fig. 5 position, both latch elements are simultaneously released. It is only necessary then, in order to close the camera, to turn the bed 4 about its pintle 17, raising the links 18 and causing the lazy tong members 13 to fold so that the camera front may move into the camera body and the camera may enclose the mechanism as indicated in Fig. 1.

In order to limit the movement of the focusing ring 25 in a counter-clockwise direction, I provide a lug 46 which will strike the upstanding flange 37 of the latch element 31, and since this latch element cannot move beyond the position shown in Fig. 3, it limits the movement of the focusing ring 25.

Figure 4:
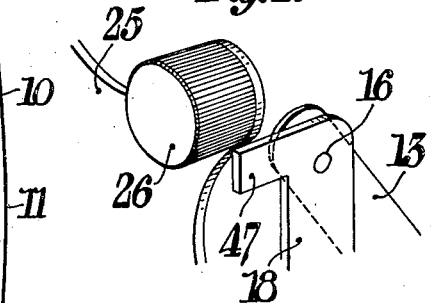
Fig. 4 is a fragmentary detail perspective showing a portion of the focusing ring operating lever.

It is obvious that if the focusing ring 25 remained in the position shown in Fig. 5, in which both latch elements are released after the camera has been closed, and if it remained in this position when the camera was again opened, the latches could not function. Consequently, I have provided a means for restoring the focusing ring to its initial position, which is a position in which the latch elements are free from engagement with the operating abutments 36 and 45 of the ring. This is accomplished in the following manner: The link 18 which connects one lazy tong member 13 with the camera bed 4 is provided with an extension 47 which lies in the path of the knob or focusing handle 26. In Fig. 5 the parts are illustrated in the position which they occupy when the lever 26 has been turned as far as possible in a clockwise direction to release the latch elements. However, when the camera bed 4 is raised to close the camera, the link 18 slides upwardly as the stud 16 slides in the slot 17 in the front board flange 38. As this link 18 moves upwardly the projection 47, as best shown in Fig. 4, strikes a portion of the handle 26 carried by the focusing ring 25 and moves it a distance sufficient for the latch engaging elements 36 and 47 of the ring to be moved to an inoperative position. This is illustrated in Fig. 3, wherein the uppermost position of the extension 47 is shown in dot-and-dash lines. When in this position the focusing ring can conveniently be arranged to have the objective focused on infinity, so that when the camera is again opened the objective 21 is in a picture-taking position and the latches are free to operate. As will be seen from the above description, the latch operating mechanism is automatically restored to a position in which the latches are free to operate, this being accomplished automatically by merely closing the camera.

Figure 2:
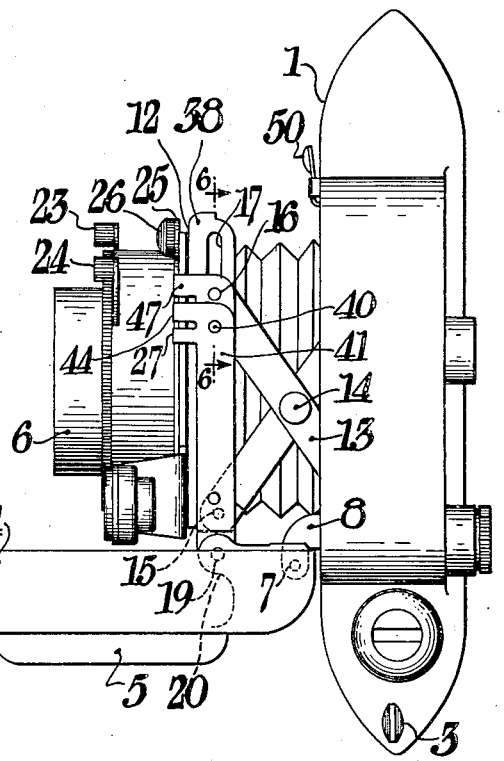
Fig. 2 is a side elevation of the camera shown in Fig. 1, but in an open position and on a somewhat enlarged scale.

The operation of the camera above described is simple. In order to open the camera a latch member 50 is pressed inwardly, thus releasing a pin 51 from a slot 52 in the latch spring 53. The camera bed is preferably equipped with a spring for automatically opening the bed to its operative position shown in Fig. 2. Although this spring is not shown in the present application, it is clearly shown and described in my copending application above referred to.

As the camera bed is lowered, causing the lazy tongs 13 to move upon their hinges 14, the stud 16 slides downwardly through the slot 17 until the pin 40 snaps into the aperture 39, thus latching one side of the lens board in position. At the same time the opposite side of the lens board is latched as part 33 of the latch member snaps over part 34 of the link 18. Thus, both latches are simultaneously operated by merely opening the camera front.

The operator may now use the camera, focusing the objective 21 by moving the handle 26 until the desired footage is registered by the graduations of scale 28 coming opposite the fixed pointer 27. Should the camera be focused on a nearby object, as, for instance, one fifteen feet from the camera, and should the operator attempt to close the camera, he would be unable to do so even if he should press the handle 35 of the latching element 31, because no manual release is provided for the latch 39—40. By turning the handle 26 as far as possible in a clockwise direction, the operator simultaneously releases latch elements 34—35 and 39—40 so that the camera can then be closed by merely turning the bed 4 upon its hinge pintle 17. As this movement occurs, the focusing ring 25 is automatically moved a short distance in a counter-clockwise direction by the extension 47 of link 18 contacting with handle 26 during the closing movement. Thus, before the camera is completely closed, the focusing ring 25 is turned to an inoperative position, insofar as the latch elements go, and is restored to a picture-taking position in that the objective 21 is moved to a position to focus objects on infinity.

My improved latching and focusing structure reduces the liability of a camera being damaged by a careless operator to a minimum. Moreover, it reduces the number of operations necessary to open or close the camera to a minimum and materially speeds up these operations.

What I claim is:

1. In a folding camera, the combination with a camera body, of a front carried by the body and adapted to be projected therefrom into an operative picture-taking position, a camera bed hingedly connected to the camera body and front, a latch for holding the hinge connections against folding, and an annular ring mounted to turn on the camera front for releasing said latch.

2. In a folding camera, the combination with a camera body, of a front carried by the body and adapted to be projected therefrom into an operative picture-taking position, a camera bed hingedly connected to the camera body and front, a latch for holding the hinge connections against folding, and an annular ring mounted to turn from a normal to an abnormal position for releasing said latch, and automatically actuated means for restoring said ring to its normal position out of contact with said latch.

3. In a folding camera, the combination with a camera body, of a front carried by the body and adapted to be projected therefrom into an operative picture-taking position, a camera bed hingedly connected to the camera body and front, a latch for holding the hinge connections against folding, and an annular ring mounted to turn from a normal position out of contact with said latch to a latch releasing position, and means connected to the camera bed for restoring the ring to its normal position operated by turning the bed about its hinge.

4. In a folding camera, the combination with a camera body, of a front carried by the body and adapted to be projected therefrom into an operative picture-taking position, a camera bed hingedly connected to the camera body and front, a latch for holding the hinge connection against folding, and an annular ring mounted to turn from a normal position out of contact with said latch to a latch releasing position, a handle for manually moving the ring to release the latch, and a member connected to the bed and operable thereby to restore the ring to a normal position by movement of the bed.

5. In a folding camera, the combination with a camera body, of a front carried by the body and adapted to be projected therefrom into an operative picture-taking position, a camera bed hingedly connected to the camera body and front, a pair of spaced latch elements for holding the hinge connections against movement, a single movably mounted member carried by the camera front and including a handle adapted when in one position to engage and release both latch elements.

6. In a folding camera, the combination with a camera body, of a front carried by the body and adapted to be projected therefrom into an operative picture-taking position, a camera bed hingedly connected to the camera body and front, a pair of spaced latch elements, springs for holding the latch elements in a latching position in which they are adapted to hold the hinge connections against movement, a single movable member frictionally carried by the camera front, a handle for moving the movable member to engage and release the latch elements, said movable member being adapted to hold the latch elements against the pressure exerted by their respective springs in an unlatched position.

7. In a folding camera, the combination with a camera body, of a front carried by the body and adapted to be projected therefrom into an operative picture-taking position, a camera bed hingedly connected to the camera body and front, a pair of spaced latch elements, springs for holding the latch elements in a latching position in which they are adapted to hold the hinge connections against movement, a single movable member frictionally carried by the camera front, a handle for moving the movable member to engage and release the latch elements, said movable member being adapted to hold the latch elements against the pressure exerted by their respective springs in an unlatched position, and means carried by the bed for adjusting the movable member to a position out of contact with said latches actuated by movement of the bed upon its hinge.

8. In a folding camera, the combination with a camera bed, of a camera front of a self-erecting type, means for latching the front in a fixed position relative to the bed, an objective carried by the camera front, means for focusing the objective, and connections between said focusing means and latching mechanism for releasing the camera front when said focusing lever is moved to a predetermined position.

9. In a folding camera, the combination with a camera bed, of a camera front of a self-erecting type, means for latching the front in a fixed position relative to the bed, an objective carried by the camera front, means for focusing the objective including a member adapted to turn about the axis of the objective, a lug carried by said member and adapted to engage and release said latching means when turned to a predetermined position.

10. In a folding camera, the combination with a camera bed, of a camera front of a self-erecting type, means for latching the front in a fixed position relative to the bed, an objective carried by the camera front, means for focusing the objective including a member adapted to turn about the axis of the objective, a lug carried by said member and adapted to engage and release said latching means when turned to a predetermined position, and means operable by the movable camera front for moving the focusing means to a position in which the lug and latching means are out of engagement.

11. In a folding camera, the combination with a camera body, of a bed hinged thereto, a camera front, connections between the camera front and body including lazy tongs to the camera body and front, a focusing mechanism carried by the front, and connections between the camera bed and lazy tongs including links pivoted to both, and latches between the front and bed and the front and a link for holding the camera front and bed fixed in a picture-taking position.

12. In a folding camera, the combination with a camera body, of a bed hinged thereto, a camera front, connections between the camera front and body including lazy tongs to the camera body and front, a focusing mechanism carried by the front, and connections between the camera bed and lazy tongs including links pivoted to both, and latches between the front and bed and the front and a link for holding the camera front and bed fixed in a picture-taking position, and means for releasing both latches simultaneously.

13. In a folding camera, the combination with a camera body, of a bed hinged thereto, a camera front, connections between the camera front and body including lazy tongs to the camera body and front, a focusing mechanism carried by the front, and connections between the camera bed and lazy tongs including links pivoted to both, and latches between the front and bed and the front and a link for holding the camera front and bed fixed in a picture-taking position, a focusing lens mount movably mounted on the camera front, means for focusing the mount including a lever carried by the camera front, and means carried by the lever for simultaneously releasing both latch elements.

14. In a folding camera, the combination with a camera body, of a bed hinged thereto, a camera front, connections between the camera front and body including lazy tongs to the camera body and front, a focusing mechanism carried by the front, and connections between the camera bed and lazy tongs including links pivoted to both, and latches between the front and bed and the front and a link for holding the camera front and bed fixed in a picture-taking position, a focusing lens mount movably mounted on the camera front, means for focusing the mount including a lever carried by the camera front, and means carried by the lever for simultaneously releasing both latch elements, said lever when in latch releasing position being adapted to position the lens mount against the camera front.

15. In a folding camera, the combination with a camera body, of a bed hinged thereto, a camera front, connections between the camera front and body including lazy tongs to the camera body and front, a focusing mechanism carried by the front, and connections between the camera bed and lazy tongs including links pivoted to both, and latches between the front and bed and the front and a link for holding the camera front and bed fixed in a picture-taking position, a focusing lens mount movably mounted on the camera front, means for focusing the mount including a lever carried by the camera front, and means carried by the lever for simultaneously releasing both latch elements, said lever when in latch releasing position being adapted to position the lens mount against the camera front, and means actuated by a link for moving the focusing means from its latch releasing position operable by moving the camera bed about its hinge.

16. In a camera of the self-erecting front type, the combination with a camera body, of a front movable relative thereto to and from an operative position, pivoted arms supporting said front relatively to the camera body, latches for holding the front and pivoted arms in an erect position, an objective carried by the front, means to focus the objective including a movable member, lugs on the lever adapted to engage and release the latches for holding the front in an operative position when said lever is moved to a predetermined position, and operative connections between the focusing means and a pivoted arm when these parts are moved to a predetermined position for moving the focusing means to a position in which the latches may function.

CHESTER W. CRUMRINE.